(12) United States Patent
Zimmer et al.

(10) Patent No.: US 7,392,371 B2
(45) Date of Patent: Jun. 24, 2008

(54) METHOD AND APPARATUS FOR USING A VOLUME TOP FILE TO BOOT FIRMWARE MODULES

(76) Inventors: Vincent J. Zimmer, 1937 S. 369th St., Federal Way, WA (US) 98003; Kirk D. Brannock, 7546 58th Ave. NE., Olympia, WA (US) 98516; Sham M. Datta, 532 Lenox St., Hillsboro, OR (US) 97124

( * ) Notice: Subject to any disclaimer, the term of this patent is extended or adjusted under 35 U.S.C. 154(b) by 825 days.

(21) Appl. No.: 10/032,141

(22) Filed: Dec. 20, 2001

(65) Prior Publication Data

US 2003/0120909 A1      Jun. 26, 2003

(51) Int. Cl.
*G06F 9/00* (2006.01)
(52) U.S. Cl. .......................................................... 713/1
(58) Field of Classification Search .................... 713/1
See application file for complete search history.

(56) References Cited

U.S. PATENT DOCUMENTS

| | | | | |
|---|---|---|---|---|
| 5,325,532 A | * | 6/1994 | Crosswy et al. ................ | 713/2 |
| 6,081,890 A | | 6/2000 | Datta | |
| 6,202,091 B1 | | 3/2001 | Godse | |
| 6,374,338 B1 | * | 4/2002 | Garvey .......................... | 713/2 |
| 6,732,265 B2 | * | 5/2004 | Esfahani et al. ................ | 713/1 |
| 6,816,963 B1 | * | 11/2004 | Krithivas et al. ............... | 713/1 |
| 6,868,507 B1 | * | 3/2005 | Gurumoorthy et al. ......... | 714/25 |
| 2003/0066062 A1 | * | 4/2003 | Brannock et al. ........... | 717/169 |

OTHER PUBLICATIONS

Intel Corporation, "Extensible Firmware Specification", Version 1.02, pp. 319-326, located at http://www.mit.edu/afs/sipb/contrib/doc/EFI/EFISpec_v102.pdf, last visited on Jun. 18, 2004 (publication date Dec. 12, 2000).

Grawrock, D., "Building Trust and Privacy into Open PC Systems", 6 pages, located at http://www.intel.com/update/departments/initech/it11001.pdf, last visited on Jun. 18, 2004 (publication date Nov. 2000).

Kinney, M., "Solving BIOS Boot Issues with EFI", 6 pages, located at http://www.intel.com/update/departments/initech/it09006.pdf, last visited on Jun. 18, 2004 (publication date Sep. 2000).

* cited by examiner

*Primary Examiner*—Rehana Perveen
*Assistant Examiner*—Eric Chang
(74) *Attorney, Agent, or Firm*—Joni D. Stutman-Horn

(57) ABSTRACT

A boot routine is initialized in a computer by bootstrapping a volume top file (VTF) located in a first addressable location accessible upon the initializing of the boot routine and the volume top file bootstrapping a set of firmware modules.

31 Claims, 3 Drawing Sheets

METHOD AND APPARATUS FOR USING A VOLUME TOP FILE TO BOOT FIRMWARE MODULES

FIELD OF THE INVENTION

This invention relates to a boot process.

BACKGROUND

Typical computer systems have a basic input output (BIOS) program for starting the computer as well as for managing data flow between the operating system (OS) and various types of attached devices (e.g., hard disk, keyboard, mouse, printer). The BIOS is made accessible to the processing units of the computer, for example, on an erasable programmable read-only memory chip. When the BIOS boots up (starts up) the computer, it determines if the attached devices are in place and operational and then loads the operating system (or key parts of it) into the random access memory (RAM) of the computer from the hard disk. When attached device details change, the BIOS program needs to be changed, either during computer system setup or manually.

DETAILED DESCRIPTION

In general, in one aspect, the invention features a boot routine initialized in a computer by bootstrapping a volume top file (VTF) located in a first addressable location accessible upon the initializing of the boot routine and the volume top file bootstrapping a set of firmware modules.

Figure 1:
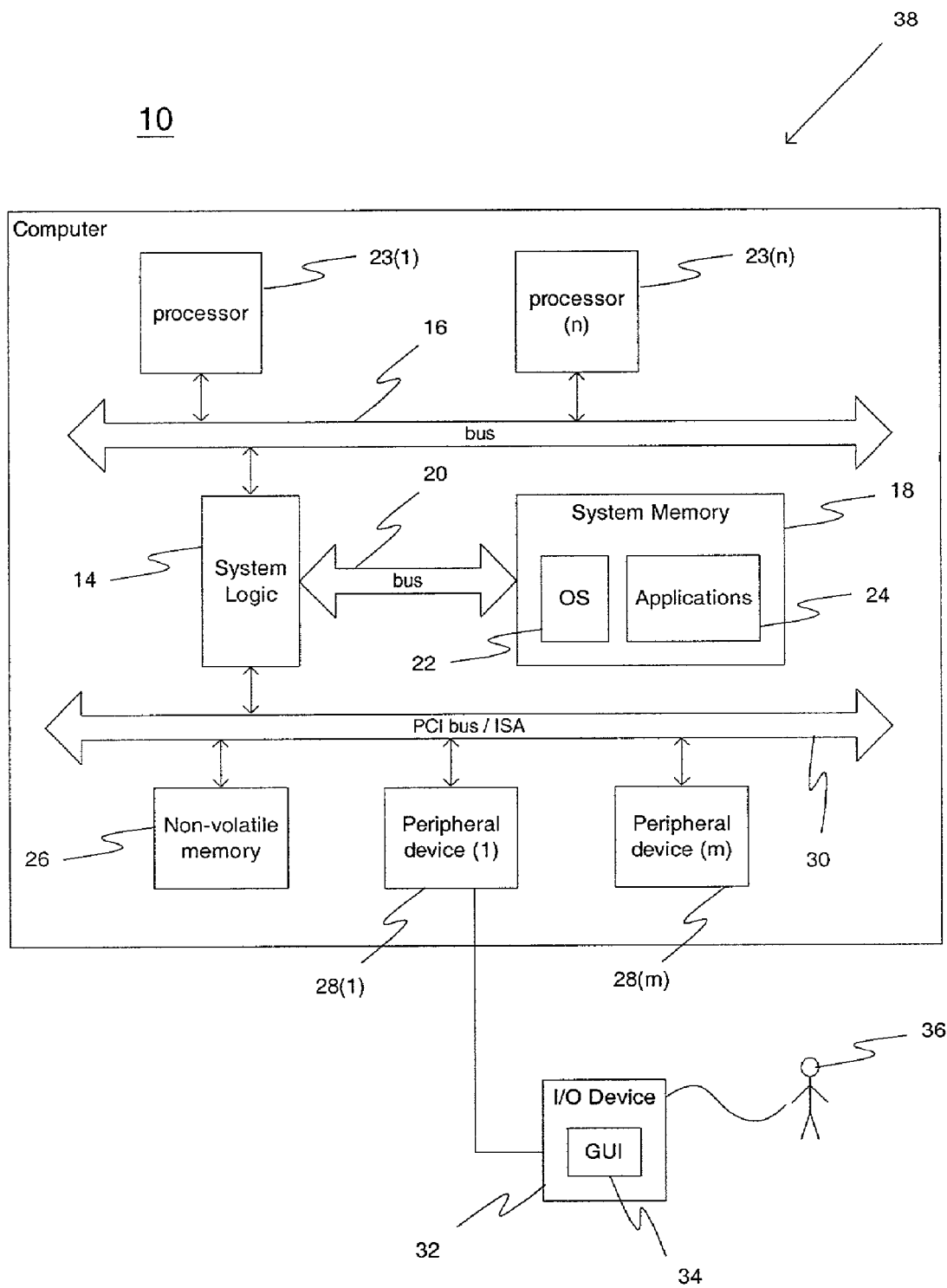
FIG. 1 is a block diagram of a computer system.

Referring to FIG. 1, an example of a computer 10 includes one or more processors 23(1)-23(n) (collectively, processors 23) coupled to a system logic 14 through a processor bus 16. The system memory 18 is coupled to the system logic 14 through a memory bus 20. The system memory 18 stores an operating system (OS) stack 22 and application programs 24. A peripheral bus 30 connects a non-volatile memory 26 and one or more peripheral devices 28(1)-28(m) (collectively, peripheral devices 28) to the system logic 14. The peripheral devices 28 include, for example, an I/O device 32 that provides a graphical user interface (GUI) 34 for a user 36.

A computing platform 38 represents the underlying computer system on which application programs 24 can run. Computing platform 38 is formed by a peripheral devices 28 and the system logic 14. During a boot process, computer 10 loads OS stack 22 into system memory 18 or non-volatile memory 26. Once OS stack 22 is loaded, computer 10 is ready for users to run application programs 24.

Figure 2:
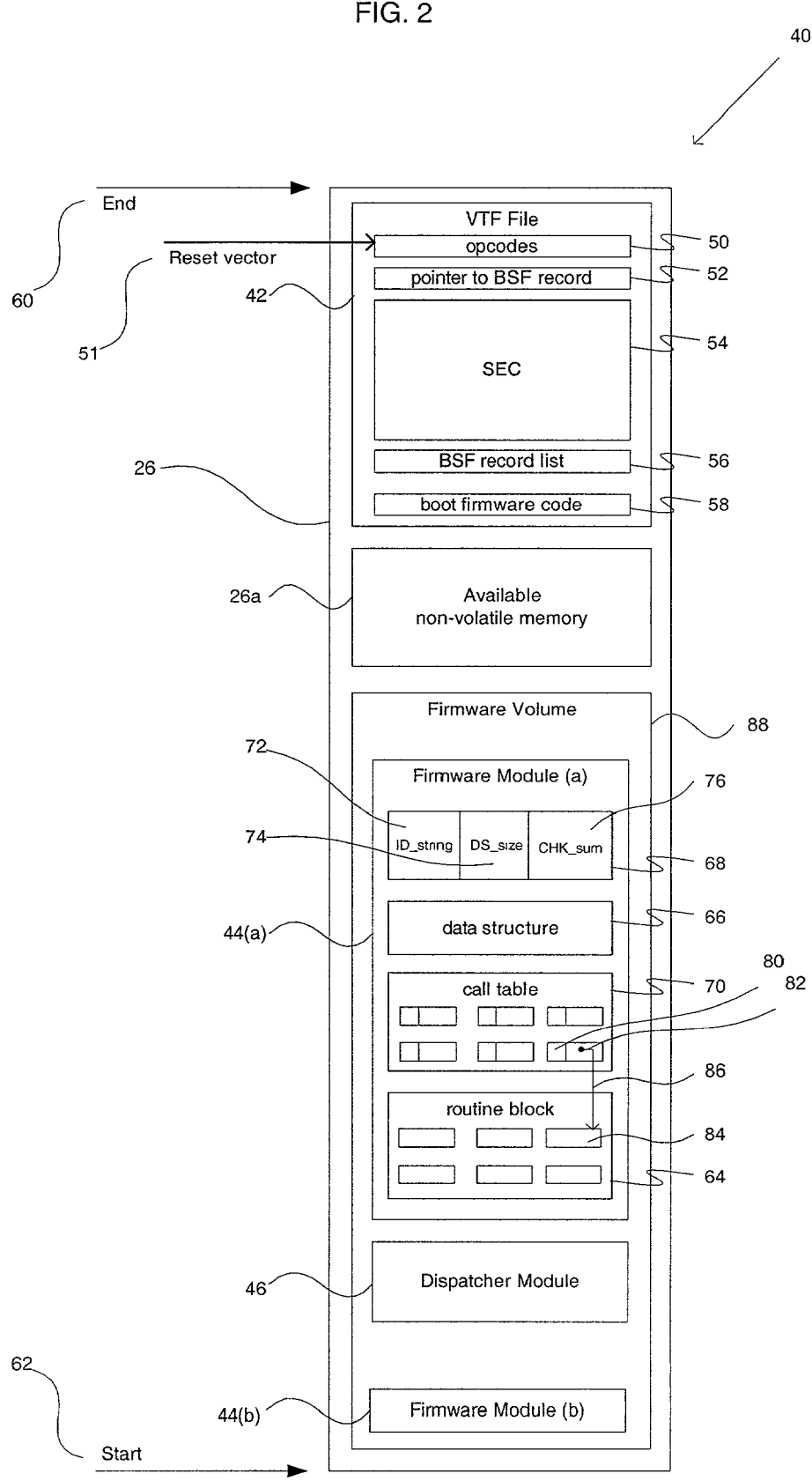
FIG. 2 is a block diagram of a boot system of the computer system of FIG. 1.

Referring to FIG. 2, the non-volatile memory 26 has a firmware system 40. The firmware system 40 includes a reset vector 51, a VTF file 42, and a firmware volume 88.

The reset vector 51 is an addressable location in the non-volatile memory 26 that includes the first instruction to be executed by the processor after the processor has been reset. The processor architecture fixes the addressable location of the reset vector 51.

VTF file 42 allows processor 23 to correctly bootstrap Firmware Volume 88 which in turn bootstraps an Operating System (OS) of computer 10. VTF file 42 guarantees a mechanism to locate and access proper code and pointers in the Firmware Volume 88.

Unlike addressable locations of VTF file 42, whose address is fixed by the processor architecture, code and pointers in VTF file 42 do not have architecturally specified locations.

The Firmware Volume 88 includes firmware modules 44(a)-44(b) and a dispatcher module 46. Firmware modules 44(a)-44(b) include a routine block 64 and a data structure 66 and serve as a core code and specialized plug-in system which personalizes firmware system 40 to computing platform 38. Dispatcher module 46 is a module that identifies the memory location or address of firmware modules 44(a)-44(b) and executes firmware modules 44(a)-44(b) in a Predictable Useful Order, i.e., in a non-random order.

Firmware system 40 also includes an available (i.e., unused) block of non-volatile memory 26a. The order of the addressable locations of the firmware modules 44(a)-44(b) and the dispatcher module 46 in the non-volatile memory is not fixed in advance. Any module or dispatcher may be located anywhere in the memory 26 and those locations may differ from computer to computer. VTF file 42 includes "bridges" between code architecturally specified by processor 23 and platform code which is not architecturally specified by processor 23.

VTF file 42 provides a mechanism to locate code and data at fixed locations required by the processor architecture and to bootstrap other firmware modules 44(a)-44(b) residing within firmware volume 88.

The data structure 66 is given a label assigned to identify data structure 66 in system memory 18 (e.g., tagged) by an identifier block 68 that allows the data structure to be identified and validated by another firmware module such as firmware module 44(b). The data structure 66 includes multiple storage locations that store values used to point to components of the firmware system 40. For example, the values stored in the multiple storage locations of the data structure 66 allow routines from firmware module 44(a) to access routines in the firmware module 44(b). VTF file 42 includes a priori information to access a base of firmware system 40, which is then used by firmware modules 44(a)-44(b) to publish a general set of access services to discover additional volumes. The multiple storage locations can also store pointers to the dispatcher module 46 and other types of addresses. Values that determine the multiple storage locations differ from type of platform and vendor. For example, a server vendor may have a larger volume with components abstracting server chipsets and features such as more fault tolerant features or SCSI support, whereas a desktop or workstation may have more consumer-oriented features such as richer graphics support.

Identifier block 68 is associated with data structure 66 and includes information that allows a routine block of firmware module 44(a) to locate and validate data structure 66. Identifier block 68 includes an identification string 72 such as a 16-byte guaranteed unique identifier (GUID) which is a statistically unique value used to "name" a given service interface or containing file, a size parameter 74 (DS_SIZE), and a checksum value 76 (CHK_SUM). The ID_STRING 72 is a string of characters for which a routine 84 in the routine block 64 may be scanned and fetched. DS_SIZE 74 indicates the size of the data structure 66 and the CHK_SUM is a value derived from the data structure 66 for the purpose of ensuring there has been no corruption of data structure 66.

The routine block 64 of the firmware module 44(a) provides firmware-level support for resources associated with related devices. For example, the routine block 64 includes code sequences that initialize and configure keyboards, input devices, video displays, or similar devices that have been developed by various Independent Hardware Vendors (IHVs), Independent BIOS Vendors (IBVs), and Original Equipment Manufacturers (OEMs) for use on the computing platform 38.

Firmware module 44(*a*) also includes a call table 70 that stores indexes and pointers to routines in the routine block 64. For example, a pointer 82 is assigned an index 80 through which an associated routine 84 may be accessed via a logical link 86.

VTF file 42 of firmware system 40 includes an opcode 50 which is "consumed" by the reset vector 51. That is, firmware system 40 is executed in response to a first opcode fetch operation of the processors 12 upon a restart event (e.g., an event that triggers a boot process by which the processor restarts operation) in a "fetch/execute cycle." Reset vector 51 is determined by a particular CPU micro-architecture. Therefore, VTF file 42 must be constructed to comply with the hardware requirements of the particular CPU micro-architecture being used. VTF file 42 is located at the top of firmware system 40 within an architecture of variable file locations In the "fetch/execute" cycle of the first opcode fetch operation, each instruction fetch cycle of the processors 23(*n*) processes instructions by first reading an instruction from the non-volatile memory 26 and then, depending on the instruction, executing it. Then each of the processors 23(*n*) fetches the next instruction from system memory 18, and so forth. The restart event, which includes a full system reset ("cold boot") or a CPU-only reset ("warm boot") includes a POST (Power On Self Test). In particular, the POST test is a test the computer 10 performs on its hardware, processors 12, and system memory 18 when the power is switched on. Opcode 50 can be, for example, a JMP (jump) or indirect branch instruction which computer 10 executes first via one of the fixed locations in the VTF file 42 (e.g., the offset into a security code (SEC) component 54) to access additional containers of files or ensuing instructions located in VTF file 42. Thus, when computer 10 is powered on for the first time, opcode 50 is a required entry point for passing control to other containers of files residing in VTF file 42 such as pointer 52 (FIG. 2).

VTF file 42 includes a VTF record list 56, the security code (SEC) 54, a pointer 52 to VTF record list 56, and a boot firmware volume (BFV) base 58. VTF file 42 is a file that conforms to a specification such as the Extensible Firmware Interface (EFI) specification which is designed to enable developers to easily implement different computing platforms. For example, the EFI specification describes a common framework with a set of core components, such as Plug-in Environment Initialization (PEI) and Driver Execution Environment (DXE) core files. The EFI specification provides a core framework and environment that is platform and Operating System (OS) independent. Moreover, the EFI specification is both a binary interface and API-set.

Accordingly, the EFI specification defines an interface between the OS 22 and the platform 38 residing in the non-volatile memory 26. The interface provided by the EFI specification includes platform-related information and boot/runtime service calls that are available to the OS 22 and its loader.

VTF record list 56 defines a location where VTF file 42 contains a list of enumerated items, such as named record types which can include the location of at least one firmware module 44, the SEC code (SEC) 54 within VTF file 42, and the like. The startup preamble code at boot vector can "discover" the location of at least one firmware module 44, the SEC code (SEC) 54 within VTF file 4. VTF record list 56 takes necessary steps to enable the cache of processor 12 to serve as a data cache and search for boot firmware volume base 58 in VTF record list 56, authenticating firmware modules 44(*a*)-44(*b*).

SEC 54 is configured to set the machine state, enable processor cache as a data call stack, invoke optional authentication service, and prepare hand-off state, such as location of the firmware volume base such as Boot firmware volume (BFV) base 58, and pass control to the dispatcher module 46. SEC 54 serves also to enable a chain of trust. Enabling the "chain of trust" entails a transitive relationship where the first software component performs some operation on the following components to authenticate firmware modules 44(*a*)-44(*b*) and also ensure integrated support for accessing or programmatically discovering other necessary files for executing further instructions.

Pointer 52 to VTF record list 56 is a fixed-location item that allows the "discovery" of the variable-sized record list in VTF record list 56. Dispatcher module 46 is required to know the location of various firmware modules 44. Boot firmware volume (BFV) base 58 is a container including a volume of code or files used to initialize VTF file 42. The boot firmware volume base 58 is an encapsulation of files accessed by the pointer 52. Boot firmware volume (BFV) base 58 includes a routine, subroutine, or an ordered set of instructions for a program that performs a specific task. Thus, boot firmware volume base 58 combines a series of computer instructions and encapsulates the files that are accessible to the pointer 52, allowing the processor 12 to execute the code or files contained in boot firmware volume base 58.

VTF file 42 also includes a start of volume 62. SEC 54 is located between VTF record list 56 and pointer 52 that is immediately below the reset vector 51. The address of VTF file 42, and in particular, the address of opcode 50 and boot firmware volume base 58 are fixed relative to pointer 52 although the size of opcode 50 and boot firmware volume base 58 may vary.

A boot process 100 for the computer 10 will now be described with reference to FIGS. 2 and 3.

Figure 3:
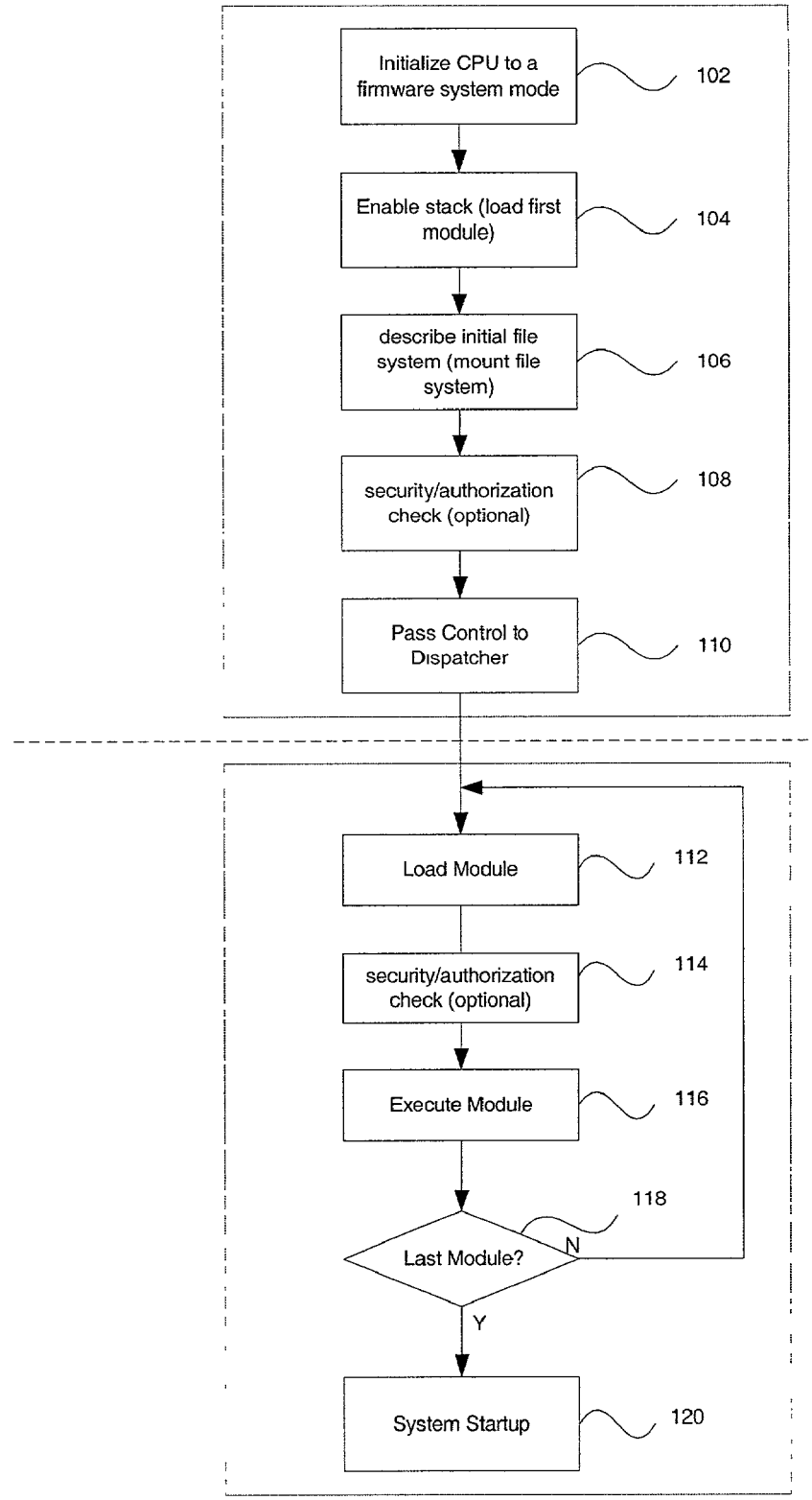
FIG. 3 is a flowchart of a boot process of the boot system of FIG. 2.

Referring to FIG. 3, in a boot process 100 for the computer 10, during the execution of the POST test, the reset vector 51 is detected. Upon detection of reset vector 51, the firmware system 40 initializes (102) a boot sequence for the processors 12. Depending on computing platform 38 used, this may include, for example, a built in self test (BIST) and a processor identity (ID) check. These boot steps are implemented in processors 12 which can be, for example, 64-bit Itanium™ processors made by Intel® Corporation, of Santa Clara, Calif., where the boot control begins with the PAL (Processor Abstraction Layer) firmware component, which hands control over to another addressable location. During the initial boot sequence or routine such as boot process 100, processors 12 fetch instructions located in VTF file 42 that are executed in response to the "fetch/execute cycle" caused by a processor reset.

Next, a process of mounting (106) an initial file system that enables the firmware module 44(*a*) in the initial file system to be discovered is performed. Mounting (106) the initial file system also includes using, e.g., the firmware dispatcher 46 (pointed to by the data structure 66) to access the appropriate routines 64 of firmware module 44(*a*) to gain access to other firmware modules such as firmware module 44(*b*). For example, dispatcher module 46 provides access to routines 64 by receiving an indexed input from any of the firmware modules and using the included index to access one of routines in the routine block 64 via the call table 70. Once the firmware module 44(*a*) has been discovered, possible authentication is provided by checking (108) that the discovered firmware module 44(a) belongs to the chain of trust. In particular, the chain of trust is a transitive relationship where firmware module 44(a) must validate or authenticate firmware module 44(b) and firmware module 44(b) would then validate succeeding firmware modules 44, and so on. The control flow of the chain of trust hand-off entails an authentication or verification of the succeeding components to maintain logical linkages of the "chain." SEC 54 accomplishes the chain of trust authentication process. Once firmware module 44(a) discovery and authentication has been completed, an architectural hand-off state is conveyed into the startup of firmware dispatcher 46 and control is passed (110) to firmware dispatcher 46. The hand-off information conveys state information about firmware volume arrangement, authorization result, and other state information known by the optional authentication that firmware module 44(a) requires.

Once control has passed (110) to firmware dispatcher 46, firmware modules 44(a) and 44(b) are loaded (112) into system memory 18 and executed in the remaining processes of the booting process 100. An optional validation check may be performed (114) and all remaining firmware modules 44 (not shown) are in turn executed (116) by checking (118) for a last module. Thereupon, the boot process 100 finally executes (120) the system start up of computer 10.

In certain embodiments, peripheral bus 30 of computer 10 represents, for example, one or more peripheral component interconnect (PCI) buses, industry standard architecture (ISA) buses, extended ISA (EISA) buses, and comparable peripheral buses. Non-volatile memory 26 may be a static memory device such as a read only memory (ROM) or flash memory. Peripheral devices 28 may also include mass storage devices such as hard drives and digital video discs (DVD). These devices, together with the system logic 14, define the computing platform 38 for computer 10, such as Intel® Architecture (IA®) platforms designed by Intel® Corporation, including Intel Architecture-32 (IA-32), XScale™, and Intel® Itanium™ chipsets. Accordingly, for computer 10, processors 12 may implement instruction set architectures (ISA), e.g., based on IA-32, XScale™ and Intel® Itanium™ processors.

A significant platform infrastructure supports IA-32, XScale™, and Intel® Itanium™ based platforms. This infrastructure includes peripheral devices 28 and basic input output systems (BIOS or firmware) necessary to boot, configure, and support these devices. For example, routines 64 include, e.g., IA-32, XScale™, or Itanium™ code sequences that initialize and configure processor(s) 12, system logic 14, system memory 18, and other resources that operate in native IA-32, XScale™ or Itanium™ environments, respectively.

In certain embodiments, the non-volatile memory 26 stores the firmware system 40 that includes binaries provided by the various types of peripheral devices and types of platforms. To achieve source level integration in the implementation of diverse architectures, components and new functionality, a core common framework is provided which is platform or chipset agnostic. Thus, rather than supporting a monolithic binary for the firmware system 40, binary interoperability among various components is provided via a binary interface.

As described above, the EFI specification provides the core framework and environment which can be platform and API independent, thus providing a common, core standard environment for booting OS 22. The EFI specification, for example, is designed as a pure interface specification and as such, this specification defines a set of interfaces and structures that computing platform firmware must implement. Similarly, the EFI specification defines a set of interfaces and structures that OS 22 uses in the boot process as in boot process 100 described above. Accordingly, OS 22 and firmware system 40 need only communicate necessary and required information to support boot process 100.

Therefore, the abstraction embodied in the EFI specification to move from a framework of monolithic binaries to a modularized firmware design focuses on no run-time calls to the BIOS, thus defining a boot infrastructure and a set of services that constitute a common platform definition and specification. In particular, the access to the peripheral devices 28 are abstracted through "handles" and "protocols." This facilitates the use and reuse of existing firmware code by keeping the underlying implementation requirements out of the specification without burdening complicated accesses to the device.

The EFI specification can define a common boot environment abstraction for use by loaded EFI images, which includes EFI drivers, EFI application and EFI OS loaders. In certain embodiments, the EFI specification also includes runtime services, system partition, and reuse of existing table-based interfaces, among others.

Furthermore, in certain embodiments, the flow of the boot process 100 for a computer 10 dictates the design of VTF file 42. For example, in the IA-32 platforms, the processors 12 fetch opcodes 50 located at address 4 GB minus 16 (FIG. 2). In addition, the boot operation 100 needs to be precisely described from the reset vector 51 onward. For example, for IA-32 and Itanium based microprocessors, the reset vector 51 must exist near the top of the 32-bit address space. For a 32-bit processor family such as the IA-32, this address is fixed at 4 Gbyte ("giga bytes") minus 16. Accordingly, firmware system 40 provides a distinguished module which is the first file to be executed and whose end must be aligned with the 4 Gbyte boundary. The distinguished module is the VTF file 42. Therefore, VTF file 42 is distinguished not only in that it is required to bootstrap the non-volatile memory 26 but it must also be the last file of firmware system 40.

While the embodiments above are implemented with IA-32, XScale™, and Itanium™-based ISAs (Instruction Set Architectures), the system and method described above are applicable to other ISAs, from mobile systems to servers.

Other implementations are within the scope of the following claims.

What is claimed is:

1. A method comprising:
   initializing a boot routine in a computer, the computer having modular, architecturally defined, components for build firmware;
   bootstrapping a volume top file located in a first addressable location accessible upon the initializing of the boot routine, wherein the volume top file is constructed in a architecturally defined manner and is automatically executed first by platform hardware in response to a reset event; and
   the volume top file bootstrapping a set of firmware modules, wherein the volume top file conforms to an Extensible Firmware Interface (EFI) architecture.

2. The method of claim 1 further comprising using the volume top file to locate a dispatcher module.

3. The method of claim 2 further comprising using the dispatcher module to access the set of firmware modules.

4. The method of claim 3 in which the set of firmware modules initialize the computer.

5. The method of claim 1 further comprising using a reset vector to access the volume top file.

6. The method of claim 1 in which the volume top file includes addresses of the set of firmware modules.

7. The method of claim 1 in which the volume top file includes an address of a base of a first firmware module.

8. The method of claim 7 in which the base of the first firmware module includes a boot firmware volume base.

9. The method of claim 1 in which the volume top file comprises an authentication block.

10. The method of claim 1 in which the volume top file validates the set of firmware modules.

11. The method of claim 1 further comprising designating the volume lop file as a last file in the set of firmware modules.

12. The method of claim 11 in which the designating includes aligning an end of the volume top file with a memory boundary.

13. The method of claim 11 wherein the memory boundary includes between 4 and 10 giga bytes (Gbyte) of memory.

14. The method as recited in claim 1, wherein the volume top file includes bridges between code that is architecturally specified by the computer and platform code which is not architecturally specified by the computer.

15. The method as recited by claim 1, further comprising: locating code and data at fixed locations required byte computer architecture.

16. The method as recited by claim 1, wherein the volume top file includes a priori information to access a base of firmware system, the firmware base to be used by the set of firmware modules to publish a general set of access services to discover volumes.

17. The system as recited in claim 1, wherein the volume top file comprises a prefix data structure having a guaranteed unique identifier (GUID).

18. A system comprising:
a non-volatile memory of a computer that initializes a boot routine in the computer, the computer having modular, architecturally defined, components for build firmware;
a processing architecture of the computer configured to bootstrap a volume top file located in a first addressable location accessible upon the initializing of the boot routine; and
the volume top file configured to bootstrap a set of firmware modules, wherein the volume top file conforms to an Extensible Firmware Interface (EEI) architecture, and wherein the volume top file is constructed in a architecturally defined manner to be automatically executed first by computer hardware in response to a reset event.

19. The system of claim 18 in which the volume top file is configured to locate a dispatcher module.

20. The system of claim 18 in which the dispatcher module is configured to access the set of firmware modules.

21. The system of claim 18 in which the set of firmware modules are configured to initialize the computer.

22. The system of claim 18 in which the volume top file includes addresses of the set of firmware modules.

23. The system of claim 18 in which the volume top file includes an address of a base of a first firmware module.

24. An apparatus comprising:
a processor, the processor having modular, architecturally defined, components for build firmware;
a non-volatile memory in which is stored:
a volume top file located in a first addressable location of the non-volatile memory accessed by a central processing unit (CPU) of a computer, the volume top file being architecturally defined and automatically accessible by hardware using a reset, and wherein the volume top file conforms to an Extensible Firmware Interface (EFI) architecture;
a data structure associated with a first firmware module; and,
a second firmware module accessible by the volume top file.

25. The apparatus of claim 24 in which a first firmware module comprises a distinguished firmware module.

26. The apparatus of claim 24 further comprising a dispatcher module located by the volume top file.

27. The apparatus of claim 24 in which the set of firmware modules include an initialization routine for initializing the computer.

28. The apparatus of claim 24 in which the volume top file includes an address of a base of the second firmware module.

29. The apparatus of claim 28 in which the base of the second firmware module comprises a boot firmware volume base.

30. The apparatus of claim 24 in which the volume top file includes an authentication block.

31. The apparatus of claim 24 in which the volume top file validates the second firmware module.

* * * * *